(12) United States Patent
Mizutani et al.

(10) Patent No.: US 10,033,291 B2
(45) Date of Patent: Jul. 24, 2018

(54) POWER TRANSMISSION DEVICE

(71) Applicant: NTN CORPORATION, Osaka (JP)

(72) Inventors: Masatoshi Mizutani, Kuwana (JP); Hiroyuki Noda, Kuwana (JP); Natsuhiko Mori, Kuwana (JP); Tomoya Kawai, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/412,970

(22) Filed: Jan. 23, 2017

(65) Prior Publication Data

US 2017/0163167 A1 Jun. 8, 2017

Related U.S. Application Data

(63) Continuation of application No. PCT/JP2015/070739, filed on Jul. 21, 2015.

(30) Foreign Application Priority Data

Jul. 24, 2014 (JP) .................... 2014-150742
Jul. 25, 2014 (JP) .................... 2014-151622

(51) Int. Cl.
*H02M 5/458* (2006.01)
*H02J 3/38* (2006.01)

(52) U.S. Cl.
CPC ............ *H02M 5/458* (2013.01); *H02J 3/383* (2013.01)

(58) Field of Classification Search
CPC .............. H02M 5/458; H02M 5/4585; H02M 7/53873; H02M 7/53875; H02M 7/5395;

(Continued)

(56) References Cited

U.S. PATENT DOCUMENTS 5,416,686 A * 5/1995 Azuma ................ H02M 5/458
363/37
5,914,866 A * 6/1999 Eguchi ............... H02M 7/4807
363/131

(Continued)

FOREIGN PATENT DOCUMENTS

CN 1185053 A 6/1998
JP 10-146061 5/1998

(Continued)

OTHER PUBLICATIONS

International Preliminary Report on Patentability dated Feb. 2, 2017 in corresponding International Patent Application No. PCT/JP2015/070739.

(Continued)

*Primary Examiner* — Yemane Mehari

(57) ABSTRACT

This power transmission device is connected between an AC wiring system connected to an AC power supply, and a DC power supply, and transmits power from the DC power supply to the AC wiring system. The power transmission device includes an AC power supply voltage signal generator, a power converter, a DC voltage conversion unit, a switching element, and a switch open/close signal generator. The switch open/close signal generator includes: a control signal generation unit to generate a control signal formed from a pulse signal; and a pulse width determination unit to receive the control signal and generate a delayed signal obtained by delaying rising of the control signal, and when the delayed signal becomes a value corresponding to a magnitude of voltage of the AC power supply voltage signal, cause the control signal to fall, thereby making the control signal into the switch open/close signal.

8 Claims, 6 Drawing Sheets

(58) Field of Classification Search
CPC ........ H02M 1/12; H02M 1/14; H02M 1/4208; H02J 9/062; H02J 3/01; Y02B 70/126; Y02E 40/40
USPC .................................. 363/37, 40, 41, 44, 48
See application file for complete search history.

(56) References Cited

U.S. PATENT DOCUMENTS

| | | | | |
|---|---|---|---|---|
| 6,069,802 | A * | 5/2000 | Priegnitz | H02M 1/34 323/907 |
| 6,362,985 | B1 * | 3/2002 | Haneda | H02M 7/53871 363/132 |
| RE39,124 | E * | 6/2006 | Ehben | H01L 23/5222 257/532 |
| 7,916,505 | B2 | 3/2011 | Fornage | |
| 9,509,233 | B2 * | 11/2016 | Ide | H02M 7/53871 |
| 2009/0225574 | A1 * | 9/2009 | Fornage | H02M 3/335 363/123 |

FOREIGN PATENT DOCUMENTS

| | | |
|---|---|---|
| JP | 3478338 | 12/2003 |
| JP | 2004-334704 | 11/2004 |
| JP | 2005-218151 | 8/2005 |
| JP | 2009-225574 | 10/2009 |
| WO | 2013/099918 | 7/2013 |

OTHER PUBLICATIONS

International Search Report dated Oct. 6, 2015 in corresponding International Application No. PCT/JP2015/070739.
Extended and Supplementary European Search Report dated Feb. 13, 2018 in corresponding European Patent Application No. 15824570.4, 8 pages.
Chinese Office Action dated May 4, 2018, in corresponding Chinese Patent Application No. 201580039581.2, 8 pgs.

* cited by examiner

POWER TRANSMISSION DEVICE

CROSS REFERENCE TO THE RELATED APPLICATION

This application is a continuation application, under 35 U.S.C. § 111(a), of international application No. PCT/JP2015/070739, filed Jul. 21, 2015, which is based on and claims Convention priority to Japanese patent application No. 2014-150742, filed Jul. 24, 2014 and Japanese patent application No. 2014-151622, filed Jul. 25, 2014, the entire disclosures of which are herein incorporated by reference as a part of this application.

BACKGROUND OF THE INVENTION

Field of the Invention

The present invention relates to a power (electric power) transmission device capable of supplying power generated by a DC power supply such as a photovoltaic power generation device to a commercial power supply for a dwelling house or the like so as to allow the power to be consumed in the house or the like, for example.

Description of Related Art

Conventionally, there has been proposed a device that transmits a power from a DC power supply such as a photovoltaic power generation device to a commercial power system connected to an AC power supply, with the phase matched with voltage of the AC power supply (Patent Document 1). This device converts a magnitude of voltage of the DC power supply into a magnitude of voltage necessary for power transmission to the commercial power system and controls an AC switch configured by a transistor bridge in synchronization with voltage of the AC power supply, to cause AC current (electric current) to reversely flow with the phase matched with the AC power supply.

In such a device, for example, as shown in FIG. 5, a DC-DC converter 51 with an isolation transformer is used for converting a voltage inputted from a DC power supply 50. The DC-DC converter 51 is switched, by a switching element 52 such as a transistor, between a closed state in which a current from the DC power supply 50 flows to a primary side of the isolation transformer, and an open state in which the energy accumulated in the closed state is released and the current flows to a secondary side of the isolation transformer.

RELATED DOCUMENT

Patent Document

[Patent Document 1] JP Patent No. 3478338

In the case where the above device is connected to a commercial power system 53, a current is caused to reversely flow with the phase matched with the sinewave voltage of the system. In order to enhance the power factor of this device, it is preferable that the waveform of the current to reversely flow is the same sinewave as voltage of the system. Therefore, as shown in FIG. 6, a PWM control is performed so as to change a time width t1 in which the switching element connected to the primary side of the isolation transformer is turned on, in accordance with the voltage of the system.

It is desirable to perform the PWM control using voltage of the AC power supply on the device output side and current flowing to the primary side of the isolation transformer. In order to obtain a signal of current flowing through the isolation transformer, a shunt resistor 54 is used which is connected in series to the transformer, as shown in FIG. 5. The current signal can be obtained from voltage between both ends of the shunt resistor 54. In view of efficiency, it is necessary to reduce the resistance value thereof as much as possible, but in this case, the current signal becomes small. Then, in the case of performing the PWM control using the current signal, there is a possibility that the circuit operation becomes unstable due to switching noise from the switching element 52.

SUMMARY OF THE INVENTION

An object of the present invention is to provide a power transmission device that is less likely to be influenced by switching noise so that the circuit operation is stabilized.

Hereinafter, the present invention will be described, while referring to the reference characters in the embodiments for convenience sake in order to facilitate the understanding.

A power transmission device of the present invention is a power transmission device which is connected between an AC wiring system 2 connected to an AC power supply 3, and a DC power supply 1, and which transmits power from the DC power supply 1 to the AC wiring system 2, the power transmission device including:

an AC power supply voltage signal generator 10 connected to the AC wiring system 2 and configured to detect a polarity and a magnitude of voltage in the AC wiring system 2 and to generate an AC power supply voltage signal;

a power converter 7 configured to repeatedly open and close a connection between the DC power supply 1 and the AC wiring system 2 in accordance with changes in the polarity and the magnitude of voltage detected by the AC power supply voltage signal generator 10, thereby converting a DC power outputted from the DC power supply 1, into an AC power;

a DC voltage conversion unit 6 including a first isolation transformer isolating an input side and an output side from each other, the DC voltage conversion unit 6 being configured to perform a voltage conversion of DC voltage of the DC power supply 1 and to apply resultant voltage to the power converter 7;

a switching element 11 configured to switch between a closed state in which DC voltage of the DC power supply 1 is applied to the input side of the DC voltage conversion unit 6, and an open state in which the DC voltage is not applied; and a switch open/close signal generator 12 configured to generate a switch open/close signal for opening or closing the switching element 11, wherein the switch open/close signal generator 12 includes:

a control signal generation unit 14 configured to generate a control signal formed from a predetermined pulse signal; and a pulse width determination unit 15 configured to receive the control signal and generate a delayed signal obtained by delaying rising of the control signal, and when the delayed signal becomes a value corresponding to a magnitude of voltage of the AC power supply voltage signal, to cause the control signal to fall, thereby making the control signal into the switch open/close signal.

As the AC power supply 3, for example, a commercial power supply of AC voltage 100V is applied.

As the DC power supply 1, for example, a photovoltaic power generation device or a battery is applied.

The predetermined pulse signal is determined by the magnitude, e.g., amplitude, of voltage generated by the AC power supply voltage signal generator 10.

In the above configuration, the AC power supply voltage signal generator 10 connected to the AC wiring system 2 detects the polarity and the magnitude of voltage in the AC power supply 3. The power converter 7 repeatedly opens and closes the connection between the DC power supply 1 and the AC wiring system 2 in accordance with the polarity and the magnitude of the detected voltage in order to match with the polarity and the magnitude of the voltage with respect to the sinewave voltage of the AC wiring system 2.

The DC voltage conversion unit 6 converts the DC voltage of the DC power supply 1 and applies the resultant voltage to the power converter 7. The DC voltage conversion unit 6 is switched, by the switching element 11, between the closed state in which DC voltage of the DC power supply 1 is applied to the input side of the first isolation transformer, and the open state in which energy accumulated in the closed state is released and the current flows to the output side of the first isolation transformer. The switch open/close signal generator 12 generates the switch open/close signal for opening (turning off) or closing (turning on) the switching element 11. The control signal generation unit 14 of the switch open/close signal generator 12 generates the control signal formed from a predetermined pulse signal. The rising time of the control signal is determined by the frequency (for example, from about several tens of kHz to several hundreds of kHz) of the control signal set to be sufficiently higher than the frequency (for example, 50 Hz or 60 Hz) of the AC power supply 3, for example.

The pulse width determination unit 15 receives the generated control signal and generates the delayed signal obtained by delaying rising of the control signal. The delayed signal obtained by delaying the rising is a delayed signal obtained by relatively reducing the rate of temporal change in the signal so as to make the rising of the signal relatively mild, and thus the delayed signal is such a signal that the output voltage gradually increases from zero as time elapses after the control signal is inputted. When the delayed signal becomes a value corresponding to the magnitude of voltage of the AC power supply voltage signal (this corresponding value is a value proportional to the magnitude of the AC power supply voltage, and the proportionality coefficient is adjusted by being determined through observation of the waveform of current to reversely flow to the AC power supply), the pulse width determination unit 15 causes the control signal to fall, thereby making the control signal into the switch open/close signal. The pulse width determination unit 15 may operate so as to reduce the pulse width when voltage of the AC power supply voltage signal is low, and to enlarge the pulse width when voltage of the AC power supply voltage signal is high, thereby causing reverse flow of current having a magnitude according to a value slightly (e.g., from several V to ten and several V) higher than voltage of the AC power supply 3.

Since the delayed signal is generated as described above and the switch open/close signal is generated through comparison between the delayed signal and the AC power supply voltage signal, the circuit operation is less likely to be influenced by switching noise and thus can be stabilized, as compared to the case of obtaining a current signal from voltage between both ends of a shunt resistor as in the conventional case. In the conventional technique, it is necessary to reduce the resistance value of the shunt resistor in order to reduce loss in the shunt resistor. Therefore, the value of a primary current signal of the first isolation transformer becomes small, and thus the circuit operation becomes more likely to be influenced by switching noise of the switching element and becomes unstable. However, this is solved by the above configuration. Therefore, the circuit operation becomes less likely to be influenced by switching noise and thus can be stabilized.

The pulse width determination unit 15 may include an integration circuit 16 configured to generate the delayed signal obtained by delaying rising of the received control signal. In this case, the delayed signal can be generated easily and reliably by the integration circuit, leading to stabilization of the circuit operation. The integration circuit 16 may be composed of a resistance element 19 and a capacitance element 20 which are connected in series (i.e., CR integration circuit). When voltage is applied to the input side of the CR integration circuit, an electric charge is accumulated or stored in the capacitance element 20 which is a capacitor. The electric charge accumulated in the capacitance element 20 can be released via the resistor. As electric charge is accumulated in the capacitance element 20, current flowing into the capacitance element 20 decreases, whereby the delayed signal obtained by delaying rising of the control signal is generated.

Preferably, the switch open/close signal generator 12A includes:

a delayed signal generator 151 configured to receive the control signal and generate a delayed signal obtained by delaying rising of the control signal; and a signal output unit 152 configured to, when the delayed signal generated by the delayed signal generator 151 becomes a value corresponding to a magnitude of voltage of the AC power supply voltage signal, cause the control signal to fall, thereby making the control signal into the switch open/close signal, wherein the delayed signal generator 151 includes a delayed signal delaying unit 151b configured to further delay rising of the delayed signal in accordance with the magnitude of voltage of the AC power supply voltage signal generated by the AC power supply voltage signal generator 10A.

The predetermined pulse signal is determined by the magnitude, e.g., amplitude, of voltage generated by the AC power supply voltage signal generator 10A.

FIG. 12 is a diagram showing the waveform of current reversely flowing to the commercial power system. In FIG. 12, at a crest vicinity 54a of a sinewave 54, the pulse width of the switch open/close signal is insufficient and the waveform is distorted. In order to increase the pulse width, for example, it is conceivable to increase a time constant of the CR integration circuit, thereby delaying rising of the pulse. However, discharge is also delayed and therefore improvement in the power factor of the device cannot be sufficiently addressed.

In the above configuration, the AC power supply voltage signal generator 10A connected to the AC wiring system 2 detects the polarity and the magnitude of voltage in the AC wiring system 2. The power converter 7 repeatedly opens and closes the connection between the DC power supply 1 and the AC wiring system 2 in accordance with the polarity and the magnitude of the detected voltage in order to match with the polarity and the magnitude of the voltage with respect to the sinewave voltage of the AC wiring system 2.

The DC voltage conversion unit 6 performs voltage conversion of DC voltage of the DC power supply 1 and applies the resultant voltage to the power converter 7. The DC voltage conversion unit 6 is switched, by the switching element 11, between a closed state in which DC voltage of the DC power supply 1 is applied to the input side of the isolation transformer, and an open state in which energy accumulated in the closed state is released and the current flows to the output side of the isolation transformer. The switch open/close signal generator 12A generates the switch open/close signal for opening (turning off) or closing (turning on) the switching element 11.

The control signal generation unit 14 of the switch open/close signal generator 12A generates the control signal formed from the predetermined pulse signal. The rising time of the control signal is determined by a frequency (for example, from about several tens of kHz to several hundreds of kHz) of the control signal set to be sufficiently higher than the frequency (for example, 50 Hz or 60 Hz) of the AC power supply 3, for example. The delayed signal generator 151 receives the generated control signal and generates a delayed signal obtained by delaying rising of the control signal. The delayed signal obtained by delaying the rising is as described above.

When the delayed signal becomes a value corresponding to the magnitude of voltage of the AC power supply voltage signal (this corresponding value is a value proportional to the magnitude of the AC power supply voltage, and the proportionality coefficient is adjusted by being determined through observation of the waveform of current to reversely flow to the AC power supply), the signal output unit 152 causes the control signal to fall, thereby making the control signal into the switch open/close signal.

The delayed signal delaying unit 151b of the delayed signal generator 151 further delays rising of the delayed signal in accordance with the magnitude of voltage of the AC power supply voltage signal generated by the AC power supply voltage signal generator 10A. For example, in the CR integration circuit, a charge current for the capacitance element 20 is decreased and a discharge current from the capacitance element 20 is increased, whereby rising of the delayed signal is delayed and falling of the delayed signal is hastened. Thus, it becomes possible to ensure a sufficient pulse width for the switch open/close signal and apply a sinewave current in which the sinusoidal waveform is less distorted. This enables enhancement of the power factor of the device.

Thus, in the above configuration, while a necessary pulse width is ensured, distortion of the current waveform is reduced, whereby the power factor of the device can be improved.

The delayed signal generator 151 may include an integration circuit 151a configured to generate the delayed signal obtained by delaying rising of the received control signal. In this case, the delayed signal can be generated easily and reliably by the integration circuit 151a. The integration circuit 151a may be composed of a first resistance element 19 and a capacitance element 20 which are connected in series (i.e., CR integration circuit). When voltage is applied to the input side of the CR integration circuit, electric charge is accumulated in the capacitance element 20 which is a capacitor. The electric charge accumulated in the capacitance element 20 can be released via the first resistance element 19. As electric charge is accumulated in the capacitance element 20, current flowing into the capacitance element 20 decreases, whereby the delayed signal obtained by delaying rising of the control signal is generated.

The delayed signal delaying unit 151b may have a second resistance element 23 and a rectification element 24 so that a charge current for the capacitance element 20 becomes smaller than a first threshold value and a discharge current from the capacitance element 20 becomes greater than a second threshold value. The first and second threshold values are determined respectively on the basis of a result of an experiment, a simulation, or the like, for example.

In this case, in rising of the control signal, for example, charge current for the capacitance element 20 that flows through the first resistance element 19 partially flows into the second resistance element 23, whereby, as compared to the case where the second resistance element 23 and the rectification element 24 are not provided, the charge current for the capacitance element 20 decreases and the rising of the control signal is delayed. In falling of the control signal, for example, the discharge current from the capacitance element 20 flows into the first and second resistance elements 19 and 23, whereby, as compared to the case where the second resistance element 23 and the rectification element 24 are not provided, the discharge current from the capacitance element 20 increases and the falling of the control signal becomes faster. As a result, while a necessary pulse width is ensured, distortion of the current waveform is reduced, whereby the power factor of the device can be improved.

The AC power supply voltage signal may be generated using AC voltage that is generated using a second isolation transformer so as to be isolated from the AC power supply 3. In this case, by the second isolation transformer, the primary coil and the secondary coil are isolated from each other, whereby noise on the primary side can be prevented from directly transmitting to the secondary side, and the safety can also be enhanced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
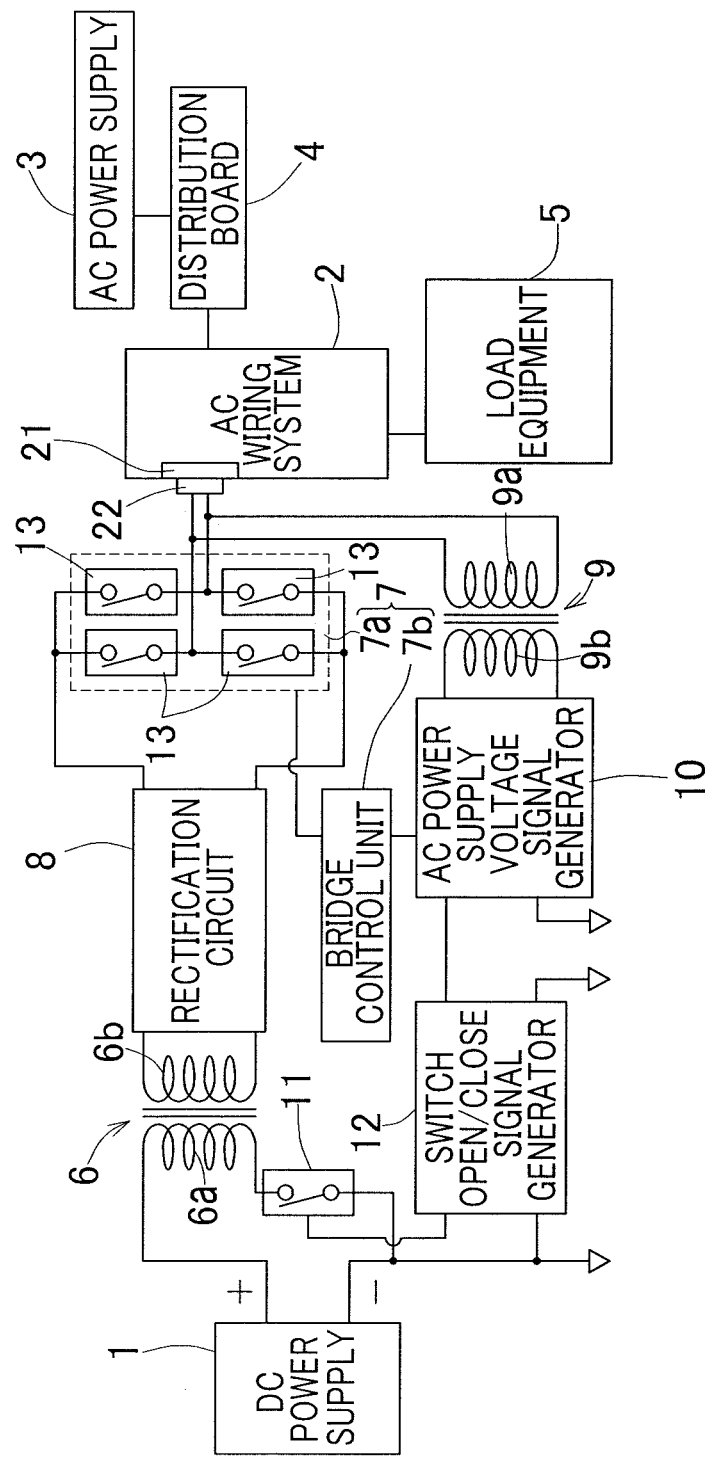
FIG. 1 is a circuit diagram of a power transmission device according to the first embodiment of the present invention.

A power transmission device according to the first embodiment of the present invention will be described with reference to FIGS. 1 to 4. FIG. 1 is a circuit diagram of the power transmission device according to the present embodiment. The power transmission device transmits power from a DC power supply 1 to an AC wiring system 2 which is an indoor wiring. The power transmission device is, for example, capable of supplying power generated by the DC power supply 1 such as a photovoltaic power generation device to the AC wiring system 2 in a house or the like, connected to an AC commercial power supply, so as to allow the power to be consumed in the house or the like.

The power transmission device is connected between the AC wiring system 2 connected to the AC power supply 3, and the DC power supply 1. The AC wiring system 2 is connected to the single-phase AC power supply 3 via a distribution board 4 of the house or the like, for example. Voltage on the wiring on the indoor side with respect to the distribution board 4 of the house or the like actually varies depending on the usage state of a connected electric appliance, but in ordinary houses, slight variation in the voltage, the voltage waveform, or the frequency does not influence the operation of the electric appliance. Therefore, there is no problem even if a DC power generated by the DC power supply 1 is converted into an AC power by a DC voltage conversion unit, a power converter, or the like having simple configurations, and the AC power is consumed in the house.

As the AC power supply 3, for example, a commercial power supply of AC voltage 100V is applied. As the DC power supply 1, for example, a battery of a photovoltaic panel or a photovoltaic power generation device, or another battery (e.g., a battery of an electric vehicle, connected to the distribution board of the house or the like) is applied. A load equipment 5 is connected to the AC wiring system 2, DC power generated by the DC power supply 1 is converted into the AC power by a DC voltage conversion unit 6, power converter 7, or the like, and the AC power is supplied to the load equipment 5. The power transmission device includes the DC voltage conversion unit 6, a rectification circuit 8, the power converter 7, an AC voltage conversion unit 9, an AC power supply voltage signal generator 10, a switching element 11, a switch open/close signal generator 12, and a plug 22. The power transmission device allows power generated by the DC power supply 1 to be consumed in the house or the like, merely by inserting the plug 22 connected to the output side of the power converter 7, into an outlet 21 provided in the AC wiring system 2. The outlet 21 may be any outlet provided in the AC wiring system 2.

In this example, the DC voltage conversion unit 6 is an isolation-type flyback converter including a first isolation transformer isolating the input side and the output side from each other. Between two terminals of the DC power supply 1, a primary coil 6a of the DC voltage conversion unit 6 and the switching element 11 are connected in series. For example, the DC voltage conversion unit 6 converts DC voltage of the DC power supply 1 to stepped-up or boosted DC voltage, and applies the stepped-up DC voltage to the power converter 7 described later, via the rectification circuit 8. The voltage of power generated by the photovoltaic power generation device is about DC 35V, and the DC voltage conversion unit 6 steps up the DC voltage of about DC 35V, to about DC 100V.

In the DC voltage conversion unit 6, when the switching element 11 is set to a closed state (ON) in which DC voltage of the DC power supply 1 is applied to the primary coil 6a (input side), current flows through the primary coil 6a and the core is magnetized by the magnetic flux generated thereby. When the switching element 11 is set to an open state (OFF), the energy accumulated in the core is released and current flows through the secondary coil 6b (output side). In the DC voltage conversion unit 6, a magnetic field in the reverse direction is applied with a reverse magnetization coil and the above-mentioned ON/OFF control of the switching element 11 is performed, whereby an induced electromotive force in a so-called third quadrant is generated. Thus, the secondary-coil voltage can be greatly varied relative to a variation in the primary-coil voltage.

The power converter 7 repeatedly opens and closes a connection between the DC power supply 1 and the AC wiring system 2, to convert a DC power outputted from the DC power supply 1, into an AC power. The power converter 7 has a bridge 7a including a plurality of switching elements 13, and a bridge control unit 7b for controlling the bridge 7a. At a line connected between the bridge 7a and the AC wiring system 2, a primary coil 9a of the AC voltage conversion unit 9 including a second isolation transformer isolating the input side and the output side from each other is connected in parallel with the bridge 7a and the AC wiring system 2.

Between the primary coil 9a and a secondary coil 9b of the AC voltage conversion unit 9, AC voltage from the AC wiring system 2 is transformed in accordance with a turn ratio between the primary coil 9a and the secondary coil 9b. The AC voltage to be outputted from the AC voltage conversion unit 9 is generated using the second isolation transformer so as to be isolated from the AC power supply 3. The AC power supply voltage signal generator 10 includes an electric circuit composed of a capacitor, an inductor, a regulator, a semiconductor element, or the like, detects a polarity and a magnitude of the AC voltage transformed by the AC voltage conversion unit 9, and generates and outputs an AC power supply voltage signal. In accordance with the polarity and the magnitude of voltage detected by the AC power supply voltage signal generator 10, the bridge control unit 7b performs a control to repeatedly open (turn off) and close (turn on) the plurality of switching elements 13, thereby converting a DC power into an AC power in the bridge 7a. Specifically, the bridge control unit 7b is configured from a circuit or a function capable of calculating a switch signal for repeatedly opening (turning off) or closing (turning on) the plurality of switching elements 13, in response to input of the polarity and the magnitude of voltage detected by the AC power supply voltage signal generator 10, using a LUT (Look Up Table) realized by software or hardware, a predetermined conversion function stored in a library of software, hardware equivalent thereto, or the like (hereinafter, referred to as an "embodied model"). Further, the bridge control unit 7b includes an electronic circuit or an electric circuit for driving, for example, a PWM signal corresponding to the switch signal.

Figure 2:
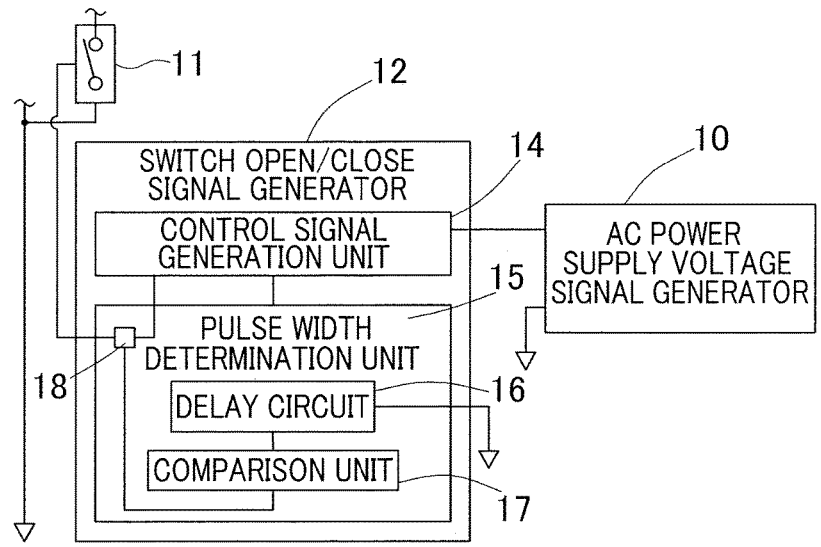
FIG. 2 is an enlarged block diagram showing a major part of the power transmission device.

FIG. 2 is an enlarged block diagram showing a major part of the power transmission device. The switch open/close signal generator 12 is connected between the AC power supply voltage signal generator 10 and the switching element 11. The switch open/close signal generator 12 is configured to generate a switch open/close signal for opening or closing the switching element 11, and has a control signal generation unit 14 and a pulse width determination unit 15. The control signal generation unit 14 generates a control signal formed from a predetermined pulse signal. The rising time of the control signal is determined by a frequency (for example, from about several tens of kHz to several hundreds of kHz) set to be higher than the frequency (for example, 50 Hz or 60 Hz) of the AC power supply 3 (FIG. 1), for example. The predetermined pulse signal is determined by the magnitude, e.g., amplitude, of voltage generated by the AC power supply voltage signal generator 10. Specifically, the control signal generation unit 14 is configured from a circuit or a function capable of calculating the rising time of the control signal in response to input of the polarity and the magnitude or the like of voltage detected by the AC power supply voltage signal generator 10, using the embodied model. Further, the control signal generation unit 14 includes an electronic circuit or an electric circuit for generating and outputting the control signal formed from the pulse signal having the set frequency.

The pulse width determination unit 15 has a delay circuit 16, a comparison unit 17, and a processing unit 18. The delay circuit 16 receives the control signal and generates a delayed signal obtained by delaying rising of the control signal. When the delayed signal generated by the delay circuit 16 becomes a value corresponding to the magnitude of voltage of the AC power supply voltage signal, the pulse width determination unit 15 causes the control signal to fall, thus making the control signal into a switch open/close signal. The pulse width determination unit 15 performs a PWM control so as to reduce the pulse width when voltage of the AC power supply voltage signal is low, and to enlarge the pulse width when voltage of the AC power supply voltage signal is high, thereby causing reverse flow of current having a magnitude according to voltage of the AC power supply 3 (FIG. 1).

Figure 3:
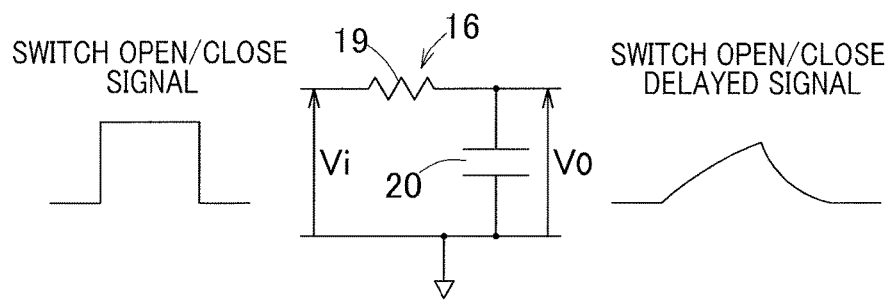
FIG. 3 is a circuit diagram showing a major part configuration of a pulse width determination unit of the power transmission device.

As shown in FIG. 3, the delay circuit 16 has an integration circuit. The integration circuit is configured from a CR integration circuit in which a resistance element 19 and a capacitance element 20 are connected in series, for example. When voltage Vi is applied to the input side of the CR integration circuit, electric charge is accumulated in the capacitance element 20 which is a capacitor. The electric charge accumulated in the capacitance element 20 can be released via the resistor. As electric charge is accumulated in the capacitance element 20, current flowing into the capacitance element 20 decreases, whereby the delayed signal obtained by delaying rising of the control signal is generated.

Figure 4:
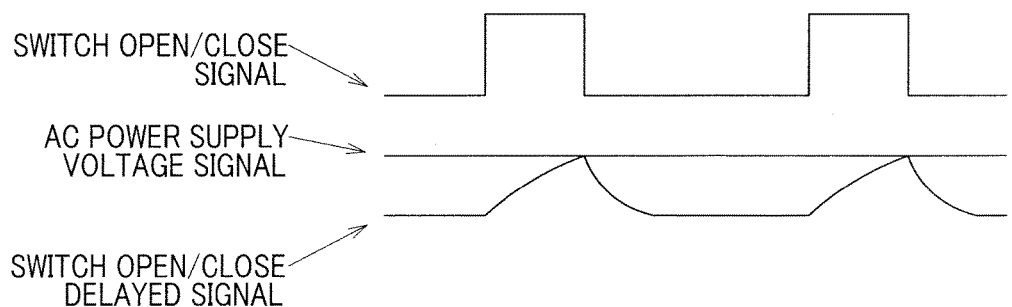
FIG. 4 is a diagram illustrating a state in which a switch open/close signal is generated through comparison between a delayed signal and the magnitude of voltage of an AC power supply voltage signal, by using of the power transmission device.
Figure 5:
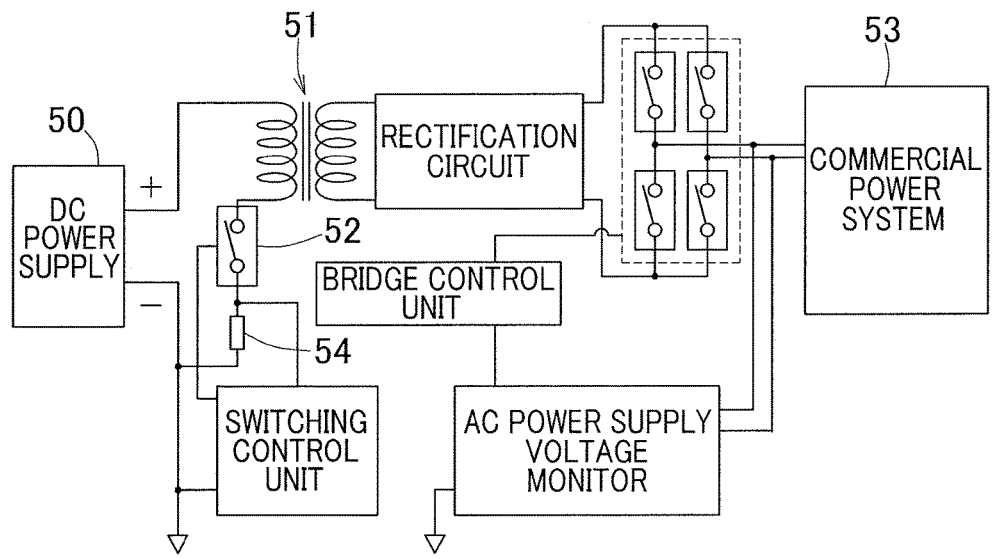
FIG. 5 is a circuit diagram of a conventional power transmission device.
Figure 6:
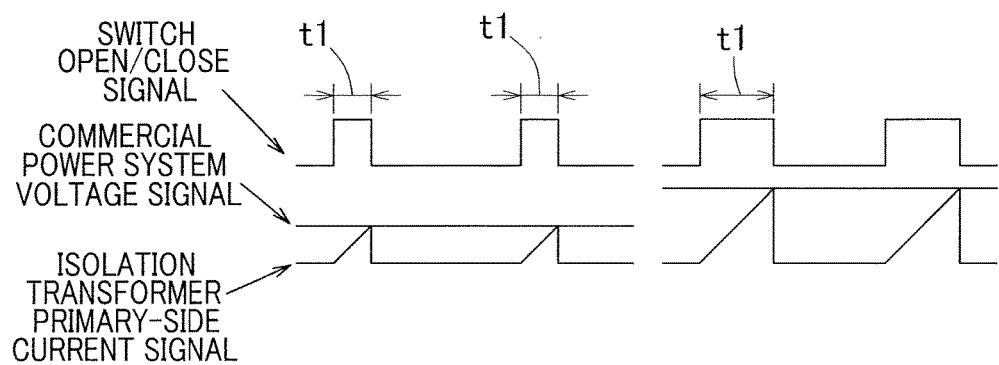
FIG. 6 is a diagram illustrating a state in which a pulse width of a switch open/close signal for a switching element is determined through comparison between a commercial power supply voltage signal and a primary-side current signal of an isolation transformer, by using of the conventional power transmission device.

FIG. 4 is a diagram illustrating a state in which the switch open/close signal is generated through comparison between the delayed signal and the magnitude of voltage of the AC power supply voltage signal, by using of the power transmission device. As shown in FIGS. 2 and 4, the rising time of the delayed signal is determined by the set frequency (for example, from about several tens of kHz to several hundreds of kHz). The comparison unit 17 compares the delayed signal generated by the delay circuit 16, with the magnitude of voltage of the AC power supply voltage signal. When the comparison unit 17 determines that the delayed signal is greater than or equal to voltage of the AC power supply voltage signal, the processing unit 18 causes the control signal to fall, thereby making the control signal into the switch open/close signal. Specifically, the comparison unit 17 is configured from a circuit or a function capable of outputting a comparison result in response to input of the delayed signal and the AC power supply voltage signal, using the embodied model. Specifically, the processing unit 18 is configured from a circuit or a function capable of outputting the control signal caused to fall, in response to input of the comparison result from the comparison unit 17 and the output from the control signal generation unit 14, using the embodied model.

Thus, since the switch open/close signal is generated through comparison between the delayed signal and the AC power supply voltage signal, the circuit operation is less likely to be influenced by switching noise and thus can be stabilized, as compared to the case of obtaining a current signal from voltage between both ends of a shunt resistor as in the conventional case. As shown in FIG. 1, since DC power generated by the DC power supply 1 can be converted into the AC power by the DC voltage conversion unit 6, the power converter 7, or the like and the AC power can be supplied to the load equipment 5 so as to be consumed in the house, the electricity fee charged from a power company or the like can be reduced, for example. Since the DC voltage conversion unit 6, the power converter 7, or the like can be configured in a simple configuration, the cost for the power transmission device can be reduced.

A power transmission device according to the second embodiment of the present invention will be described with reference to FIGS. 7 to 11. The components with the same reference characters as in the first embodiment are the same as in the first embodiment, and therefore the description thereof is omitted unless otherwise specified.

Figure 7:
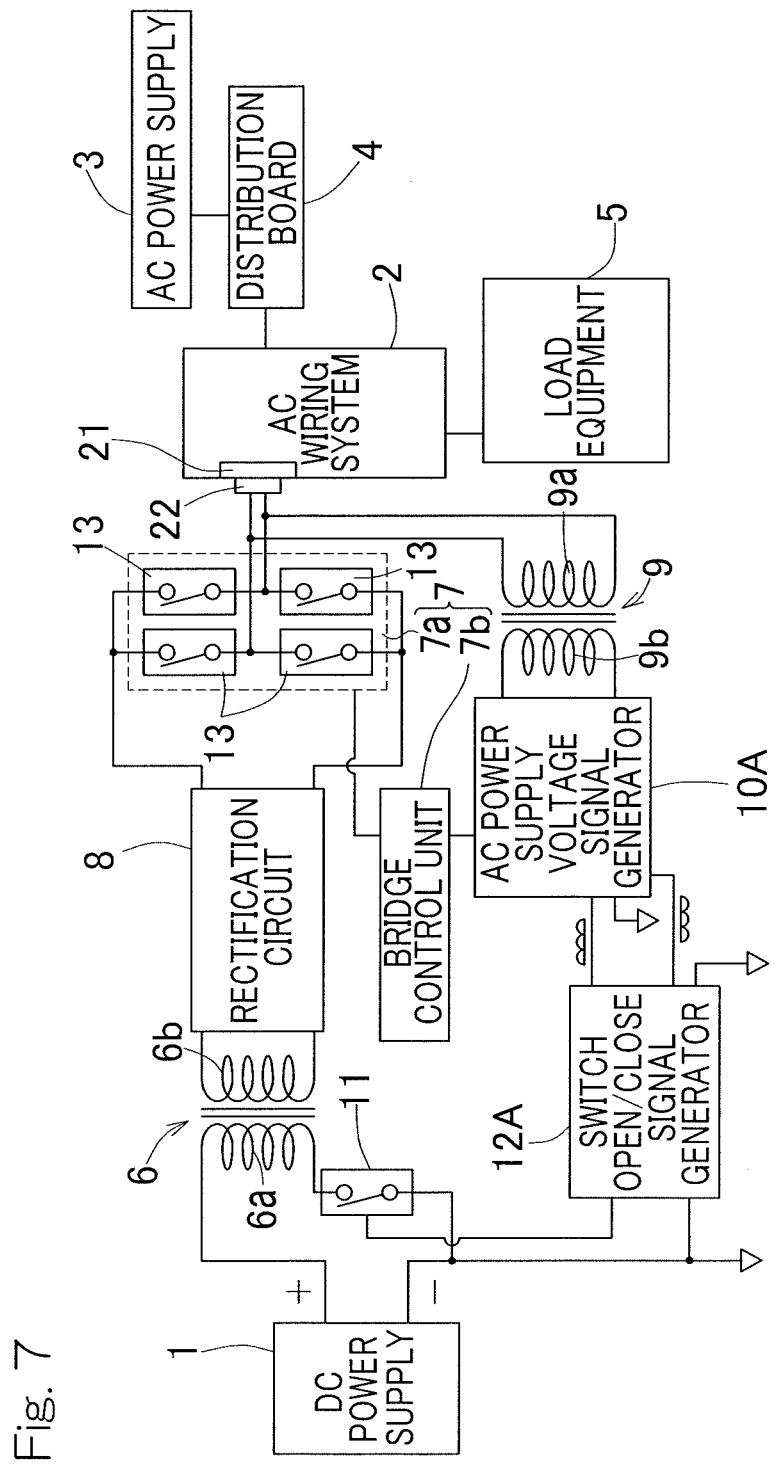
FIG. 7 is a circuit diagram of a power transmission device according to another embodiment of the present invention.

AC power supply voltage signal generator 10A in FIG. 7 includes an electric circuit composed of a capacitor, an inductor, a regulator, a semiconductor element, or the like, detects the polarity and the magnitude of the AC voltage transformed by the AC voltage conversion unit 9, and generates and outputs an AC power supply voltage signal (a commercial power system voltage signal) which has been full-wave rectified. In accordance with the polarity and the magnitude of voltage detected by the AC power supply voltage signal generator 10A, the bridge control unit 7b performs the control to repeatedly open and close the plurality of switching elements 13, thereby converting the DC power into the AC power in the bridge 7a.

Figure 8:
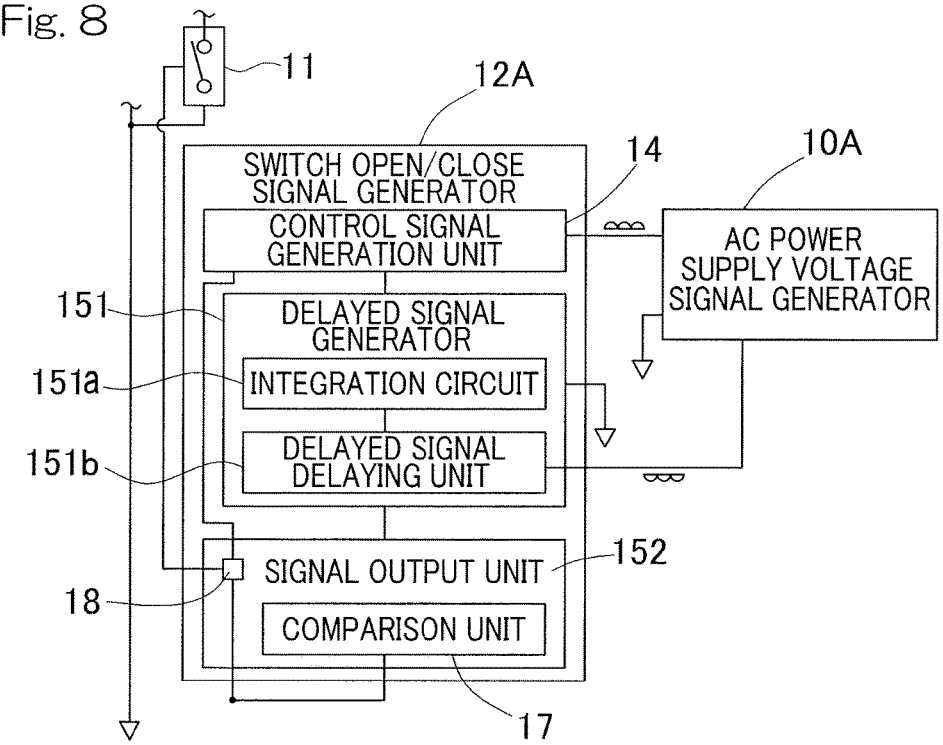
FIG. 8 is an enlarged block diagram showing a major part of the power transmission device.

FIG. 8 is an enlarged block diagram showing a major part of the power transmission device. The switch open/close signal generator 12A is connected between the AC power supply voltage signal generator 10A and the switching element 11. The switch open/close signal generator 12A is configured to generate a switch open/close signal for opening (turning off) or closing (turning on) the switching element 11, and has the control signal generation unit 14, and has a delayed signal generator 151 and a signal output unit 152 which correspond to the pulse width determination unit 15 in FIG. 2. The control signal generation unit 14 generates a control signal formed from a predetermined pulse signal. The rising time of the control signal is determined by a frequency (for example, from about several tens of kHz to several hundreds of kHz) set to be higher than the frequency (for example, 50 Hz or 60 Hz) of the AC power supply 3 (FIG. 7), for example. The predetermined pulse signal is determined by the magnitude, e.g., amplitude, of voltage generated by the AC power supply voltage signal generator 10.

Figure 9:
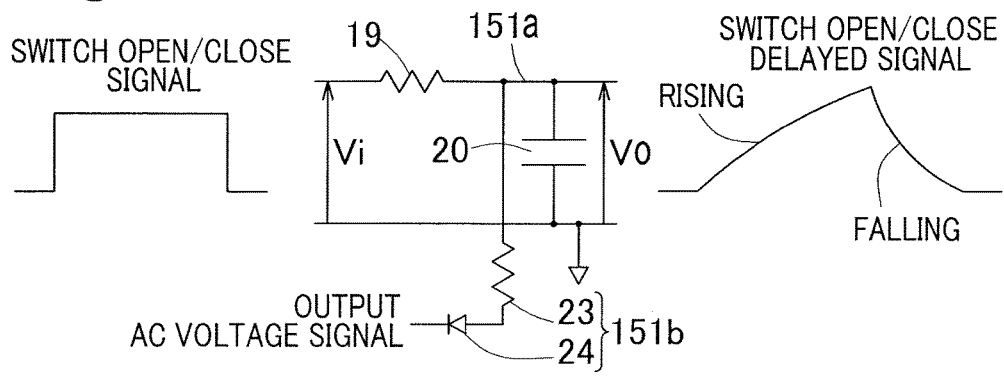
FIG. 9 is a circuit diagram showing a major part configuration of a delayed signal generator and the like in the power transmission device.

The delayed signal generator 151 receives the control signal and generates a delayed signal obtained by delaying rising of the control signal. The delayed signal generator 151 has an integration circuit 151a and a delayed signal delaying unit 151b. As shown in FIG. 9, the integration circuit 151a is a so-called CR integration circuit in which a first resistance element 19 and a capacitance element 20 are connected in series, for example. When voltage Vi is applied to the input side of the integration circuit 151a, electric charge is accumulated in the capacitance element 20 which is a capacitor. As electric charge is accumulated or stored in the capacitance element 20, current flowing into the capacitance element 20 decreases, whereby the delayed signal obtained by delaying rising of the control signal is generated. The electric charge accumulated in the capacitance element 20 can be released via the first resistance element 19 and a second resistance element 23 described later.

The delayed signal delaying unit 151b further delays the rising of the delayed signal in accordance with the magnitude of voltage of the AC power supply voltage signal generated by the AC power supply voltage signal generator 10A. The delayed signal delaying unit 151b has the second resistance element 23 and a rectification element 24 which are connected in series, for example. The delayed signal delaying unit 151b has one end connected between the first resistance element 19 and the capacitance element 20 in the integration circuit 151a, and another end connected to the AC power supply voltage signal generator 10A. A voltage signal (output AC voltage signal) of the AC power supply that is outputted from the second resistance element 23 and the rectification element 24 to the AC power supply voltage signal generator 10A, is a signal obtained by inverting the AC power supply voltage signal (the commercial power system voltage signal) outputted from the AC power supply voltage signal generator 10A to the control signal generation unit 14 (FIG. 8). Since the output AC voltage signal is inverted from the commercial power system voltage signal, the phases of these signals are different from each other by 180 degrees. The amplitude of the output AC voltage signal is determined by adjusting. The commercial power system voltage signal has a waveform obtained by full-wave rectifying a sinewave. Since the output AC voltage signal is inverted therefrom as mentioned above, the output AC voltage signal has a negative side waveform of the full-wave rectified. Therefore, as the commercial power system voltage signal becomes higher (the value is positive), the value of the output AC voltage signal becomes smaller (the value is negative). Thus, as the commercial power system voltage signal becomes higher, current drawn into the delayed signal delaying unit becomes greater, whereby the delay time can be increased.

In rising of the control signal, a charge current for the capacitance element 20 that flows through the first resistance element 19 partially flows into the second resistance element 23, whereby, as compared to the case where the second resistance element 23 and the rectification element 24 are not provided, the charge current for the capacitance element 20 decreases and the rising of the control signal is delayed. In falling of the control signal, a discharge current from the capacitance element 20 flows into the first and second resistance elements 19 and 23, whereby, as compared to the case where the second resistance element 23 and the rectification element 24 are not provided, the discharge current from the capacitance element 20 increases and the falling of the control signal becomes faster.

As shown in FIG. 8, when the delayed signal generated by the delayed signal generator 151 becomes a value corresponding to the magnitude of voltage of the AC power supply voltage signal, the signal output unit 152 causes the control signal to fall, thus making the control signal into a switch open/close signal. The signal output unit 152 performs a PWM control so as to reduce the pulse width when voltage of the AC power supply voltage signal is low, and to enlarge the pulse width when voltage of the AC power supply voltage signal is high, thereby causing reverse flow of current having a magnitude corresponding to voltage of the AC power supply 3 (FIG. 7).

Figure 10:
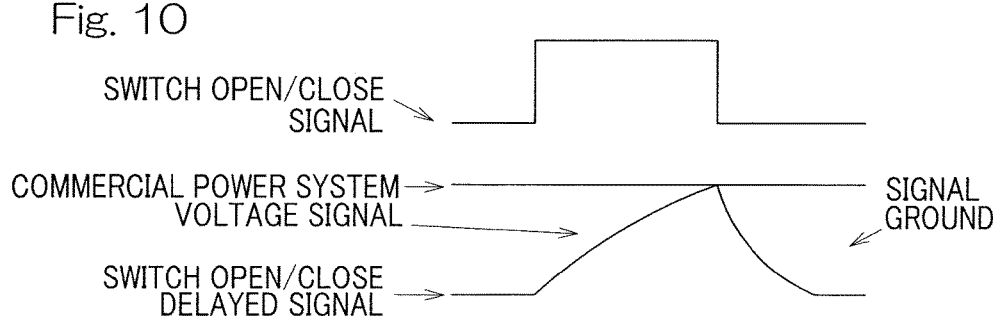
FIG. 10 is a diagram illustrating a state in which a switch open/close signal is generated through comparison between a delayed signal and the magnitude of voltage of an AC power supply voltage signal, by using of the power transmission device.

The signal output unit 152 has the comparison unit 17 and the processing unit 18. FIG. 10 is a diagram illustrating a state in which the switch open/close signal is generated through comparison between the delayed signal and the magnitude of voltage of the AC power supply voltage signal, by using of the power transmission device. As shown in FIG. 8 and FIG. 10, the comparison unit 17 compares the delayed signal generated by the delayed signal delaying unit 151b, with the magnitude of voltage of the AC power supply voltage signal. When the comparison unit 17 determines that the delayed signal is greater than or equal to voltage of the AC power supply voltage signal, the processing unit 18 causes the control signal to fall, thereby making the control signal into the switch open/close signal.

Figure 11:
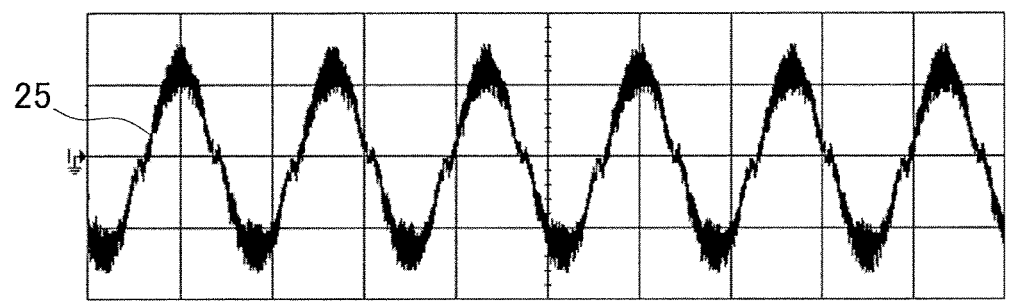
FIG. 11 is a diagram showing a state in which distortion of the current waveform of sinewave current is reduced, by using of the power transmission device.
Figure 12:
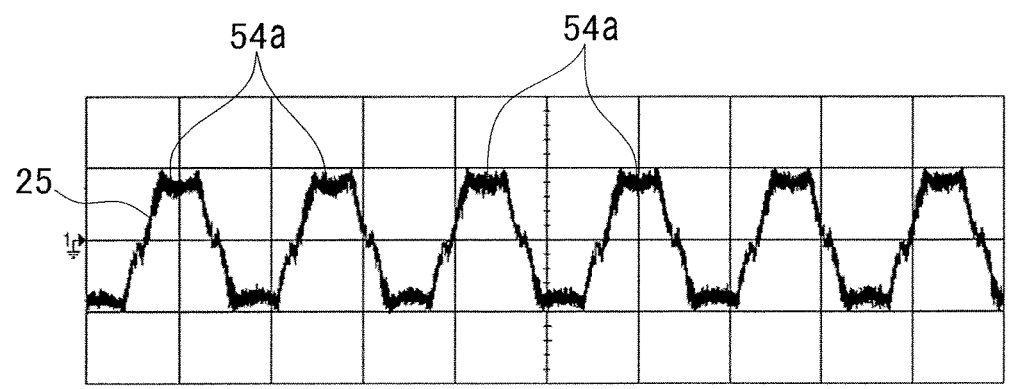
FIG. 12 is a diagram showing a conventional waveform of current reversely flowing to a commercial power system.

In the power transmission device described above, the integration circuit 151a of the delayed signal generator 151 generates the delayed signal obtained by delaying rising of the control signal. By the delayed signal delaying unit 151b of the delayed signal generator 151, the rising of the control signal is further delayed and the falling of the control signal becomes faster. As a result, while a necessary pulse width is ensured, distortion of a current waveform 25 is reduced as shown in FIG. 11, whereby the power factor of the device can be improved.

As shown in FIG. 7, since DC power generated by the DC power supply 1 can be converted into the AC power and the AC power can be supplied to the load equipment 5 so as to be consumed in the house, the electricity fee charged from a power company or the like can be reduced, for example. Since the DC voltage conversion unit 6, the power converter 7, or the like can be configured in a simple configuration, the cost for the power transmission device can be reduced as compared with the case of using a power conditioner, for example.

The second embodiment includes also the following modes in which the presence of the switch open/close signal generator having the pulse width determination unit in the first embodiment is not employed.

Mode 1

A power transmission device which is connected between an AC wiring system connected to an AC power supply, and a DC power supply, and which transmits power from the DC power supply to the AC wiring system, the power transmission device including:

an AC power supply voltage signal generator connected to the AC wiring system and configured to detect a polarity and a magnitude of voltage in the AC wiring system and to generate an AC power supply voltage signal;

a power converter configured to repeatedly open and close a connection between the DC power supply and the AC wiring system in accordance with changes in the polarity and the magnitude of voltage detected by the AC power supply voltage signal generator, thereby converting a DC power outputted from the DC power supply, into an AC power;

a DC voltage conversion unit including a first isolation transformer isolating an input side and an output side from each other, the DC voltage conversion unit being configured to perform a voltage conversion of DC voltage of the DC power supply and to apply resultant voltage to the power converter;

a switching element configured to switch between a closed state in which DC voltage of the DC power supply is applied to the input side of the DC voltage conversion unit, and an open state in which the DC voltage is not applied; and a switch open/close signal generator configured to generate a switch open/close signal for opening or closing the switching element, wherein the switch open/close signal generator includes:

a control signal generation unit configured to generate a control signal formed from a predetermined pulse signal;

a delayed signal generator configured to receive the control signal and generate a delayed signal obtained by delaying rising of the control signal; and a pulse width determination unit configured to, when the delayed signal generated by the delayed signal generator becomes a value corresponding to a magnitude of voltage of the AC power supply voltage signal, cause the control signal to fall, thereby making the control signal into the switch open/close signal, wherein the delayed signal generator includes a delayed signal delaying unit configured to further delay rising of the delayed signal in accordance with the magnitude of voltage of the AC power supply voltage signal generated by the AC power supply voltage signal generator.

Mode 2

The power transmission device described in mode 1, wherein the AC power supply voltage signal is generated using AC voltage that is generated using a second isolation transformer so as to be isolated from the AC power supply.

Mode 3

The power transmission device described in mode 1 or mode 2, wherein the delayed signal generator includes an integration circuit configured to generate the delayed signal obtained by delaying rising of the received control signal.

Mode 4

The power transmission device described in mode 3, wherein the integration circuit is composed of a first resistance element and a capacitance element which are connected in series.

Mode 5

The power transmission device described in mode 4, wherein the delayed signal delaying unit includes a second resistance element and a rectification element so that a charge current for the capacitance element becomes smaller than a first threshold value and a discharge current from the capacitance element becomes greater than a second threshold value.

If there is no legal problem, the power transmission device of the present invention can also be used for supplying power generated by the DC power supply to an AC commercial power supply outside the house and requesting a power company or the like to purchase the power.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . DC power supply
2 . . . AC wiring system
3 . . . AC power supply
6 . . . DC voltage conversion unit
7 . . . power converter
10, 10A . . . AC power supply voltage signal generator
11 . . . switching element
12, 12A . . . switch open/close signal generator
14 . . . control signal generation unit
15 . . . pulse width determination unit
151 . . . delayed signal generator
151a . . . integration circuit
151b . . . delayed signal delaying unit
152 . . . signal output unit
16 . . . delay circuit
19 . . . resistance element (first resistance element)
20 . . . capacitance element
23 . . . second resistance element
24 . . . rectification element

What is claimed is:

1. A power transmission device which is connected between an AC wiring system connected to an AC power supply, and a DC power supply, and which transmits power from the DC power supply to the AC wiring system, the power transmission device comprising:

an AC power supply voltage signal generator connected to the AC wiring system and configured to detect a polarity and a magnitude of voltage in the AC wiring system and to generate an AC power supply voltage signal;

a power converter configured to repeatedly open and close a connection between the DC power supply and the AC wiring system in accordance with changes in the polarity and the magnitude of voltage detected by the AC power supply voltage signal generator, thereby converting a DC power outputted from the DC power supply, into an AC power;

a DC voltage conversion unit including a first isolation transformer isolating an input side and an output side from each other, the DC voltage conversion unit being configured to perform a voltage conversion of DC voltage of the DC power supply and to apply resultant voltage to the power converter;

a switching element configured to switch between a closed state in which DC voltage of the DC power supply is applied to the input side of the DC voltage conversion unit, and an open state in which the DC voltage is not applied; and a switch open/close signal generator configured to generate a switch open/close signal for opening or closing the switching element, wherein the switch open/close signal generator includes;
   a control signal generation unit configured to generate a control signal formed from a predetermined pulse signal; and
   a pulse width determination unit configured to receive the control signal and generate a delayed signal obtained by delaying rising of the control signal,
   wherein when the delayed signal becomes a value corresponding to a magnitude of voltage of the AC power supply voltage signal, the pulse width determination unit is configured to cause the control signal to fall, thereby making the control signal into the switch open/close signal.

2. The power transmission device as claimed in claim 1, wherein the pulse width determination unit includes an integration circuit configured to generate the delayed signal obtained by delaying rising of the received control signal.

3. The power transmission device as claimed in claim 2, wherein the integration circuit is composed of a resistance element and a capacitance element which are connected in series.

4. The power transmission device as claimed in claim 1, wherein the switch open/close signal generator includes:
   a delayed signal generator configured to receive the control signal and generate a delayed signal obtained by delaying rising of the control signal; and
   a signal output unit configured to, when the delayed signal generated by the delayed signal generator becomes a value corresponding to a magnitude of voltage of the AC power supply voltage signal, cause the control signal to fall, thereby making the control signal into the switch open/close signal,
   wherein the delayed signal generator includes a delayed signal delaying unit configured to further delay rising of the delayed signal in accordance with the magnitude of voltage of the AC power supply voltage signal generated by the AC power supply voltage signal generator.

5. The power transmission device as claimed in claim 4, wherein the delayed signal generator includes an integration circuit configured to generate the delayed signal obtained by delaying rising of the received control signal.

6. The power transmission device as claimed in claim 5, wherein the integration circuit is composed of a first resistance element and a capacitance element which are connected in series.

7. The power transmission device as claimed in claim 6, wherein the delayed signal delaying unit includes a second resistance element and a rectification element so that a charge current for the capacitance element becomes smaller than a first threshold value and a discharge current from the capacitance element becomes greater than a second threshold value.

8. The power transmission device as claimed in claim 1, wherein the AC power supply voltage signal is generated using AC voltage that is generated using a second isolation transformer so as to be isolated from the AC power supply.

* * * * *

UNITED STATES PATENT AND TRADEMARK OFFICE
CERTIFICATE OF CORRECTION

PATENT NO. : 10,033,291 B2
APPLICATION NO. : 15/412970
DATED : July 24, 2018
INVENTOR(S) : Masatoshi Mizutani et al.

Page 1 of 1

It is certified that error appears in the above-identified patent and that said Letters Patent is hereby corrected as shown below:

In the Claims

Column 15, Line 7, In Claim 1, delete "includes;" and insert -- includes --, therefore.

Signed and Sealed this
Sixth Day of November, 2018

Andrei Iancu
*Director of the United States Patent and Trademark Office*